United States Patent [19]

Newman et al.

[11] Patent Number: 4,611,984

[45] Date of Patent: Sep. 16, 1986

[54] TEMPERATURE COMPENSATOR FOR PRESSURE OPERATED FUEL REGULATOR

[75] Inventors: Ray L. Newman, Towanda; Theodore H. Hoffman, Laceyville; Raymond E. Dorazio, Wysox; John L. Ferri, Towanda; Jeffrey M. Gonzalez, Towanda; William C. Fulkerson, Towanda, all of Pa.

[73] Assignee: GTE Products Corporation, Stamford, Conn.

[21] Appl. No.: 751,904

[22] Filed: Jul. 5, 1985

[51] Int. Cl.⁴ ............................................. F23N 1/00
[52] U.S. Cl. ........................................ 431/19; 431/41
[58] Field of Search ...................... 431/36, 41, 75, 19, 431/20

[56] References Cited

U.S. PATENT DOCUMENTS 2,085,584  6/1937  Haskell ................................. 431/19
3,146,821  9/1964  Wuetig ................................. 431/19

Primary Examiner—Carroll B. Dority, Jr.
Attorney, Agent, or Firm—William H. McNeill

[57] ABSTRACT

A multi-pass ceramic recuperator includes a temperature compensator mounted within the gaseous flow of an intermediate pass. The compensator includes a bleed valve actuated by a temperature sensitive mechanism which is mounted outside the compensator body and directly in the gaseous flow.

3 Claims, 3 Drawing Figures

TEMPERATURE COMPENSATOR FOR PRESSURE OPERATED FUEL REGULATOR

TECHNICAL FIELD

This invention is concerned with the control of fuel-/air ratios for burners by the use of pressure operated regulators. Such regulators adjust the rate of flow of fuel in accordance with variations in the combustion air flow to the burner. This invention is particularly concerned with a compensator for such regulators that compensates for variations in the temperature of the air supplied to the burner.

BACKGROUND ART

The recent increasing use of heat recuperation for energy conservation purposes has resulted in an increasing number of systems in which the air supplied to the burner has been preheated by a heat recuperator. In the prior art, controls for such systems generally operated off the ambient air line, that is to say, the prerecuperator air line. Two problems can occur with such controls. First, they do not compensate for variations that may occur in the temperature of the air exiting the recuperator. Second, they do not allow for leaks that may occur within the recuperator where air may leak directly into the exhaust line without flowing into the burner.

An improved apparatus for compensating for the temperature of the combustion air supplied to a burner is disclosed in U.S.S.N. 556,766, filed Dec. 1, 1983, and assigned to the assignee of the instant invention, and the teachings of this application are hereby incorporated by reference.

A compensator in accordance with the above-described application comprised a housing having an opening for bleeding air therethrough. There is a tapered plug in the opening which is fastened to a thermostatic metal within the housing. The cross sectional area of the plug is less than the area of the opening, the clearance around the plug being a free flow area through which air bleeds out of the compensator. The thermostatic metal is heated by the air entering the compensator. When the temperature of the air increases, the thermostatic metal is heated and deflected, thereby displacing the plug within the opening and increasing the free flow area. As a result, more air is bled out of the compensator, thereby increasing the pressure drop across the compensator.

While the compensator employing the thermostatic metal performs well, there is a lapse in operating time because of the inclusion of the thermostatic metal within the compensator housing. Also, because the compensator was located in the side wall of the recuperator housing, the compensator housing and the ceramic wall of the recuperator acted as heat sinks and caused a lag in temperature response. The design is also difficult to machine and expensive to install.

It is, therefore, an object of this invention to obviate the disadvantages of the prior art.

It is another object of the invention to enhance temperature compensators.

It is a further object of the invention to enhance recuperator operation.

These objects are accomplished, in one aspect of the invention, by the provision of a multi-pass ceramic recuperator assembly which comprises a recuperator body having a first set of passages for receiving and passing an exhaust gas and a second set of passages, orthogonal to the first set, for receiving and passing a combustion gas.

A housing is provided for the body, and has oppositely disposed inlet and outlet means for the combustion gas communicating with the second set of passages. The inlet and outlet means include baffles which divide the second set of passages into a serpentine path which includes an entrance segment, an intermediate segment, and an exit segment.

A temperature compensator is mounted within the gaseous flow of the intermediate segment. The compensator employs a thermostatic bi-metal which is mounted on the outside of the compensator housing.

Devices constructed as above remove the objectionable features of the prior art. Mounting the bi-metal on the exterior of the compensator housing, directly in the gaseous flow, increases the response time. Also, mounting the compensator in the intermediate flow segment grants greater control since the bi-metal is exposed to lower temperatures.

Desription of the Best Mode

For a better understanding of the present invention, together with other and further objects, advantages and capabilities thereof, reference is made to the following description and claims taken in conjunction with the above-described drawings.

Figure 3:
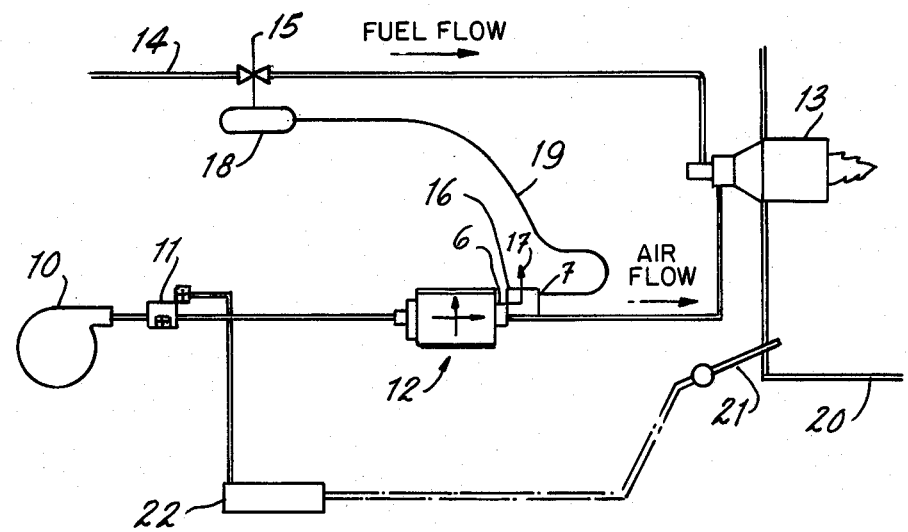
FIG. 3 is a diagrammatic view of a furnace system employing a recupertor and temperature compensator.

Referring now to the drawings with greater particularity, and in particular to FIG. 3, a blower 10 blows combustion gas through air control valve 11 and through heat recuperator 12 to burner 13. As used herein the term "combustion gas" refers to a gaseous medium containing an effective amount of oxygen to support combustion, and includes air. Fuel enters through supply line 14 and passes through fuel control valve 15 to burner 13. A compensator 16 is located so that the combustion gas supplied to intake 6 of compensator 16 is heated combustion air from an intermediate segement 30 of recuperator 12. Combustion gas is bled out of compensator 16 as shown at arrow 17. The pressure at outtake 7 of compensator 16 is delivered to regulator 18 through line 19. Regulator 18 regulates control valve 15. In operation the temperature in furnace 20 is sensed by pyrometer 21 and is controlled by temperature controller 22. Air control valve 11 is controlled by temperature controller 22.

Figure 1:
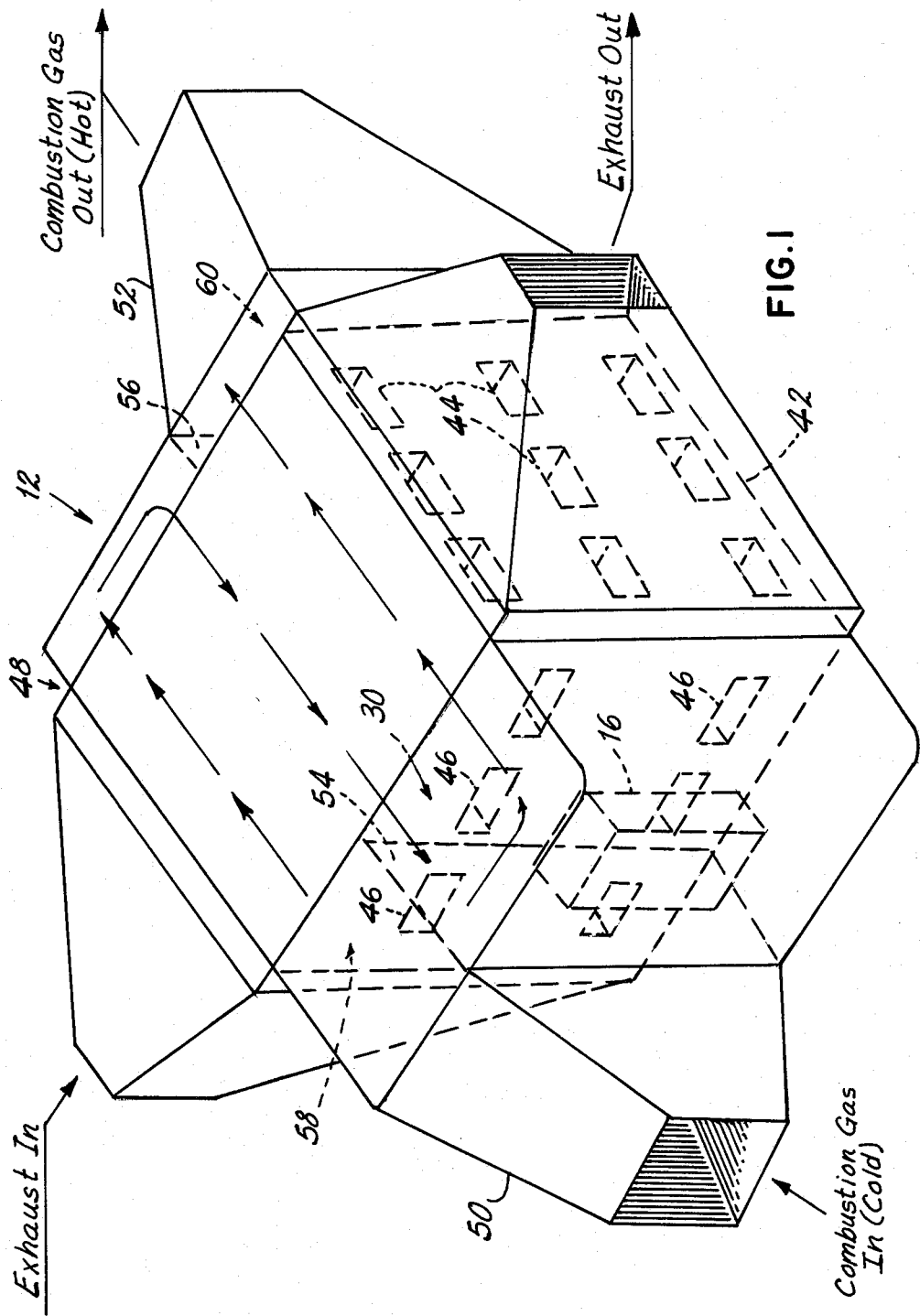
FIG. 1 is a diagrammatic, perspective view of a multi-pass recuperator assembly.
Figure 2:
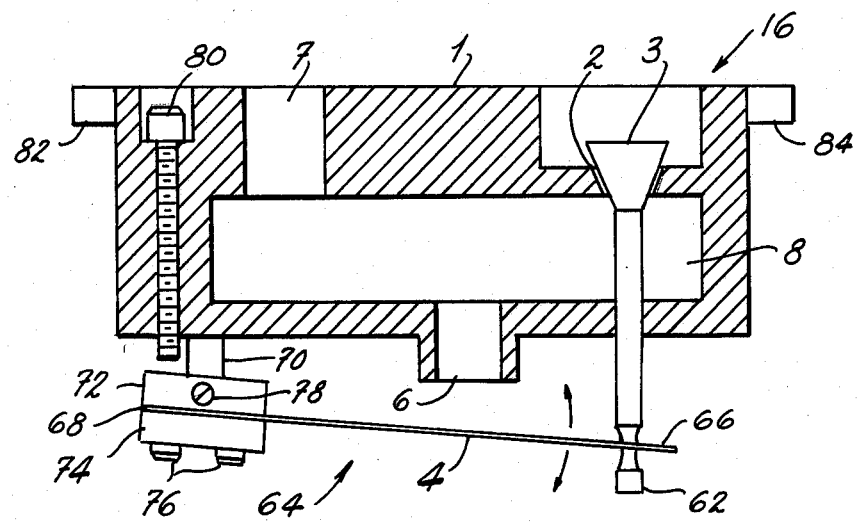
FIG. 2 is a diagrammatic, sectional view of a temperature compensator.

Referring now to FIG. 1, the multi-pass ceramic recuperator assembly 12 comprises a recuperator body 42, of ceramic, having a first set of passages 44 for receiving and passing an exhaust gas, and a second set of passages 46, orthogonal to set 44 and isolated therefrom, for receiving and passing a combustion gas.

A housing 48, of, for example, steel, encloses the body 42 and as oppositely disposed inlet and outlet means 50 and 52, respectively, for the combustion gas. The inlet and outlet means 50 and 52 communicate with the second passages 46. Inlet means 50 is provided with a baffle 54 and outlet means 52 is provided with a baffle 56 which divide the second passages 46 into a serpentine path, as shown by the arrows in FIG. 1. The serpentine path includes an entrance segment 58, an intermediate segment 30, and an exit segment 60.

A temperature compensator 16 is mounted within the gaseous flow of the intermediate segment 30.

The compensator 16 comprises a housing 1 having a tapered opening 2 for seating a tapered bleed valve 3. The valve 3 has a distal portion 62 which projects beyond housing 1.

The housing 1 is provided also with a gaseous intake 6 and a gaseous outtake 7. A chamber 8 connects the intake and outtake and communicates also with bleed valve 3. The bleed valve 3 is actuable to open and close in response to a temperature sensitive mechanism 64 which is mounted exteriorly of housing 1 and bleed gas from the chamber 8 exteriorly of housing 48 as indicated by arrow 17.

The temperature sensitive mechanism 64 comprises a thermostatic bi-metal 4 which has a first end 66 affixed to the distal portion 62 of valve 3. A second end 68 of bi-metal 4 is pivotally mounted to housing 1 by means of a "U" shaped support 70, only one leg of which is shown, and metal plates 72 and 74, between which second end 68 is clamped by bolts 76. The use of this clamping procedure allows adjustment of the bi-metal to aid in seating valve 3 to a zero position. Plate 72 is mounted for pivotal movement with support 70 by bolt 78.

A bolt 80 through compensator housing 1 is provided for further adjusting and controlling the position of the temperature sensitive mechanism 64.

Mounting lugs 82 and 84 can be used for mounting compensator 16 within inlet means 50.

In operation, the cold combustion gas enters recuperator 12 through inlet 50 and entrance segment 58 and passes through second passages 46. Baffle 56 in outlet means 52 deflects the combustion gas along the passages 46 of the intermediate segment 30. Some of the gas, which is now partially heated, enters intake 6 of compensator 16 and chamber 8. The pressure in chamber 8 is connected to the fuel regulator 18. As the combustion gas temperature increases, bi-metal 4 warps upwardly, moving bleed valve 3 open. This action reduces the pressure in chamber 8, which reduces the pressure signal to fuel regulator 18. The reduction of the pressure signal reduces the fuelflow in proportion to the combustion gas temperature and pressure.

The mounting of the compensator 16 within the gaseous flow of the intermediate segment 30 with the temperature sensitive mechanism 64 outside the compensator body, has additional benefits. It has been found that the temperature sensitive mechanism will respond to heat radiated from the ceramic body 42. This provides an added safety feature. For example, if the combustion mixture goes fuel rich so that unburned fuel is entrained in the exhaust gas, the excess fuel will burn in the heated ceramic body and the extra heat will radiate to the bi-metal 4. This will actuate the bleed valve 3, causing the compensator 16 to reduce the fuel flow and thus correct the situation.

While there have been shown and described what are at present considered to be the preferred embodiments of the invention, it will be apparent to those skilled in the art that various changes and modifications can be made herein without departing from the scope of the invention as defined by the appended claims.

We claim:

1. A multi-pass ceramic recuperator assembly comprising:
   a recuperator body having a first set of passages for receiving and passing an exhaust gas;
   a second set of passages, orthogonal to said first set, for receiving and passing a combustion gas;
   a housing for said body, said housing having oppositely disposed inlet and outlet means for said combustion gas communicating with said second set of passages, said inlet and outlet means including baffles which divide said second set of passages into a serpentine path which includes an entrance segment, an intermediate segment, and an exit segment; and
   a temperature compensator mounted within the gaseous flow of said intermediate segment, said temperature compensator comprising: a compensator housing having a gaseous intake communicating with said gaseous flow and a gaseous outtake connected to a fluid line extending out of said recuperator housing; a chamber connecting said intake and said outtake; and a bleed valve communicating with said chamber and with a fluid line extending out of said recuperator housing, said bleed valve being actuable to open and close in response to a temperature sensitive mechanism; said temperature sensitive mechanism being mounted exteriorly of said compensator housing and directly in the path of said gaseous flow from said intermediate segment.

2. The multi-pass ceramic recuperator assembly of claim 1 wherein said temperature sensitive mechanism comprises a thermostatic bi-metal.

3. The multi-pass ceramic recuperator assembly of claim 2 wherein said bi-metal has a first end affixed to a distal portion of said bleed valve and a second end pivotally mounted to said compensator housing.

* * * * *